United States Patent
Pan et al.

(10) Patent No.: US 11,765,456 B1
(45) Date of Patent: Sep. 19, 2023

(54) DIGITAL PHOTOGRAPHING DEVICE

(71) Applicant: PRIMAX ELECTRONICS LTD., Taipei (TW)

(72) Inventors: Yung-Tai Pan, Taipei (TW); Yu-Cheng Ma, Taipei (TW); Ying-Shou Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/663,023

(22) Filed: May 12, 2022

(30) Foreign Application Priority Data

Mar. 25, 2022 (TW) .................. 111111463

(51) Int. Cl.
*H04N 23/67* (2023.01)
*G03B 13/36* (2021.01)
*H04N 23/62* (2023.01)
*H04N 23/66* (2023.01)
*H04N 23/667* (2023.01)

(52) U.S. Cl.
CPC ............. *H04N 23/67* (2023.01); *G03B 13/36* (2013.01); *H04N 23/62* (2023.01); *H04N 23/66* (2023.01); *H04N 23/667* (2023.01)

(58) Field of Classification Search
CPC ........ H04N 23/67; H04N 23/62; H04N 23/66; H04N 23/667; G03B 13/36
See application file for complete search history.

(56) References Cited

U.S. PATENT DOCUMENTS

| | | | |
|---|---|---|---|
| 9,648,218 B2 * | 5/2017 | Zhang | H04N 23/631 |
| 9,692,978 B2 * | 6/2017 | Hada | H04N 23/635 |
| 2008/0074535 A1 * | 3/2008 | Ohsuga | H04N 23/74 348/E5.038 |
| 2010/0328520 A1 * | 12/2010 | Mori | G03B 17/18 348/E5.045 |
| 2015/0172531 A1 * | 6/2015 | Ikeda | H04N 23/70 348/207.11 |
| 2017/0195547 A1 * | 7/2017 | Okamura | G06T 7/70 |
| 2019/0349530 A1 * | 11/2019 | Niga | H04N 23/662 |

* cited by examiner

Primary Examiner — Shahbaz Nazrul
(74) Attorney, Agent, or Firm — WPAT, P.C

(57) ABSTRACT

A digital photographing device is provided. The digital photographing device can be operated in at least two manual focus modes to provide at least two different common focus lengths. The user can select a suitable manual focus mode from the at least two manual focus modes. When the user faces the digital photographing device to take a selfie or create a live stream, the user can realize the current focus mode of the digital photographing device in real time according to the indication of the focus mode indication module.

15 Claims, 5 Drawing Sheets

DIGITAL PHOTOGRAPHING DEVICE

FIELD OF THE INVENTION

The present invention relates to a digital photographing device, and more particularly to a digital photographing device having a function of allowing the user to receive and confirm a manual focus mode.

BACKGROUND OF THE INVENTION

Many people have experience of using digital photographing devices (e.g., digital cameras, cellphones, handheld tablets or notebook computers) to take pictures. According to the personal photographing habits or the photographing scenes, the digital photographing device usually needs to be switched from an autofocus mode to a manual focus mode. When the digital photographing device is operated in the manual focus mode, the user may operate a manual knob or a button of the digital photographing device to adjust the depth of field until the main subject comes into focus.

However, although the manual focusing process allows the user to precisely pick the exact subject that the user want to focus on, the operation of the conventional digital photographing device in the manual focus mode still has some drawbacks. For example, most users are not professional photographers. The complicated manual focusing process becomes hindrance for the unprofessional user. Eventually, the focus mode of the digital photographing device is restored from the manual focus mode to the autofocus mode by the unprofessional user, or a focusing condition worse than the autofocus mode is erroneously selected by the unprofessional user.

Moreover, in case that the user controls the conventional digital photographing device to take a selfie or create a live stream while facing the digital photographing device, the conventional digital photographing device is only operatable in the autofocus mode. The reason is that there is a certain distance between the user and the digital photographing device when the digital photographing device is used to take a selfie or create a live stream. In this situation, the user is unable to manually control the manual knob or the button of the digital photographing device to adjust the depth of field (or the focal length).

In order to overcome the drawbacks of the conventional technologies, it is important to provide a digital photographing device for allowing the user to take a selfie or create a live stream in a manual focus mode by using a simplified operating method.

SUMMARY OF THE INVENTION

The present invention provides a digital photographing device. The digital photographing device can be operated in at least two manual focus modes to provide at least two different common focus lengths. The user can select a suitable manual focus mode from the at least two manual focus modes.

The present invention provides a digital photographing device. When the user faces the digital photographing device to take a selfie or create a live stream, the user can realize the current focus mode of the digital photographing device in real time according to the indication of a focus mode indication module.

In accordance with an aspect of the present invention, a digital photographing device is provided. The digital photographing device includes a digital photographing main body and a focus mode indication module. The digital photographing main body includes a lens element. The focus mode indication module is installed in the digital photographing main body and located near a front surface of the lens element. After a user controls a switching control module to generate a focus switching control signal, the digital photographing main body receives the focus switching control signal. In response to the focus switching control signal, the focus mode indication module generates a focus mode indication signal to indicate that the digital photographing main body is in one of at least two manual focus modes. When the user faces the front surface of the lens element, the user receives and confirms the focus mode indication signal.

In an embodiment, the focus mode indication module is an optical-type focus mode indication module.

In an embodiment, the optical-type focus mode indication module includes plural LED lamps or a digital display screen. The optical-type focus mode indication module generates an optical-type focus mode indication signal to indicate that the digital photographing main body is in one of the at least two manual focus modes.

In an embodiment, the optical-type focus mode indication signal is optionally permitted to indicate that the digital photographing main body is in an autofocus mode.

In an embodiment, the at least two manual focus modes at least include a short distance focus mode, a medium distance focus mode and a long distance focus mode.

In an embodiment, the switching control module is a wireless switching control module, and the focus switching control signal is a wireless focus switching control signal. When the user faces the front surface of the lens element, the user controls the wireless switching control module to generate the wireless focus switching control signal to the digital photographing main body.

In an embodiment, the wireless switching control module is a portable handheld device, and the portable handheld device is a wireless remote controller, mobile phone or a tablet computer.

In an embodiment, the wireless switching control module is the wireless remote controller, and the digital photographing device includes the wireless remote controller and the digital photographing main body.

In accordance with another aspect of the present invention, a digital photographing device is provided. The digital photographing device includes a digital photographing main body and a focus mode indication module. The digital photographing main body includes a lens element. The focus mode indication module is installed in the digital photographing main body. After a user controls a switching control module to generate a focus switching control signal, the digital photographing main body receives the focus switching control signal. In response to the focus switching control signal, the focus mode indication module generates a focus mode indication signal to indicate that the digital photographing main body is in one of at least two manual focus modes.

In an embodiment, the focus mode indication module includes at least one of an optical-type focus mode indication module and an audio-type focus mode indication module.

In an embodiment, the optical-type focus mode indication module is installed in the digital photographing main body and located near a front surface of the lens element. The user receives and confirms the focus mode indication signal when the user faces the front surface of the lens element. The audio-type focus mode indication module is installed in the front surface, a left surface or a right surface of the lens element.

In an embodiment, the optical-type focus mode indication module includes plural LED lamps or a digital display screen. The optical-type focus mode indication module generates an optical-type focus mode indication signal to indicate that the digital photographing main body is in one of the at least two manual focus modes. The audio-type focus mode indication module is an audio output element. The audio output element generates an audio-type focus mode indication signal to indicate that the digital photographing main body is in one of the at least two manual focus modes.

In an embodiment, the optical-type focus mode indication signal or the audio-type focus mode indication signal is optionally permitted to indicate that the digital photographing main body is in an autofocus mode.

In an embodiment, the at least two manual focus modes at least include a short distance focus mode, a medium distance focus mode and a long distance focus mode.

In an embodiment, the switching control module is a wireless switching control module, and the focus switching control signal is a wireless focus switching control signal. When the user faces the front surface of the lens element, the user controls the wireless switching control module to generate the wireless focus switching control signal to the digital photographing main body.

In an embodiment, the wireless switching control module is a portable handheld device, and the portable handheld device is a wireless remote controller, mobile phone or a tablet computer.

In an embodiment, the wireless switching control module is the wireless remote controller, and the digital photographing device includes the wireless remote controller and the digital photographing main body.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1A:
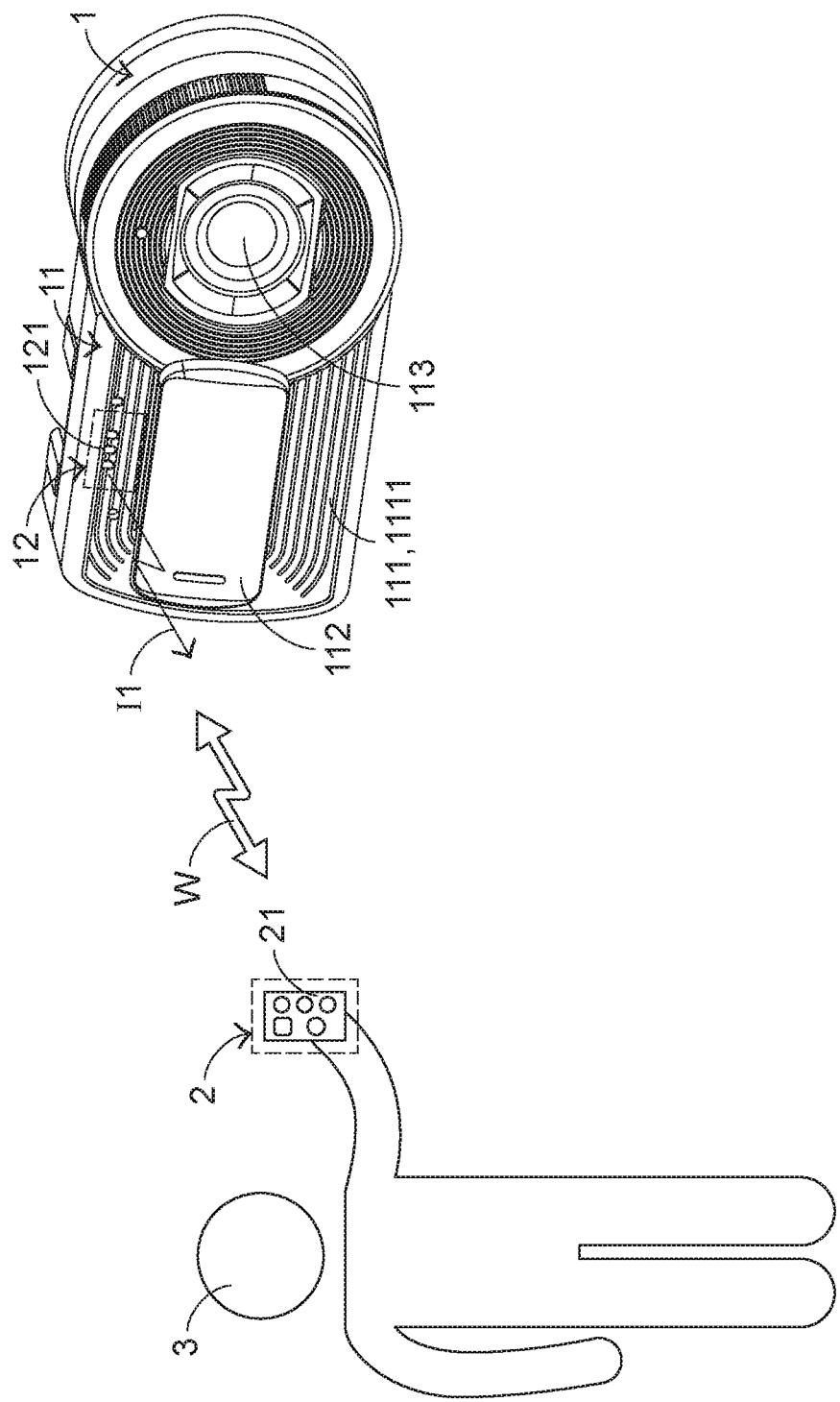
FIG. 1A is a schematic perspective view illustrating the implementation concepts of operating a digital photographing device according to a first embodiment of the present invention.
Figure 1B:
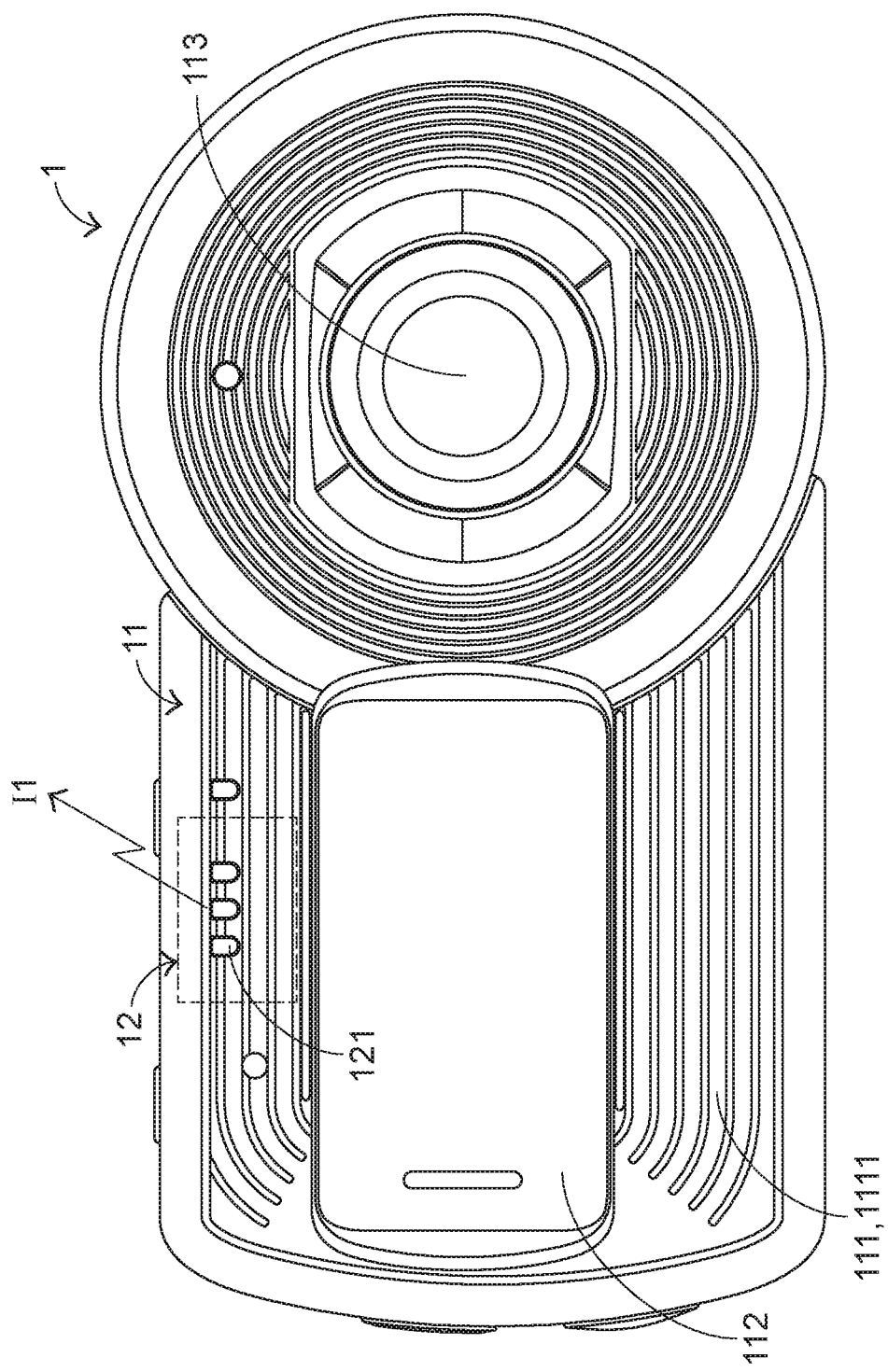
FIG. 1B is a schematic front view illustrating a digital photographing main body of the digital photographing device according to the first embodiment of the present invention.
Figure 1C:
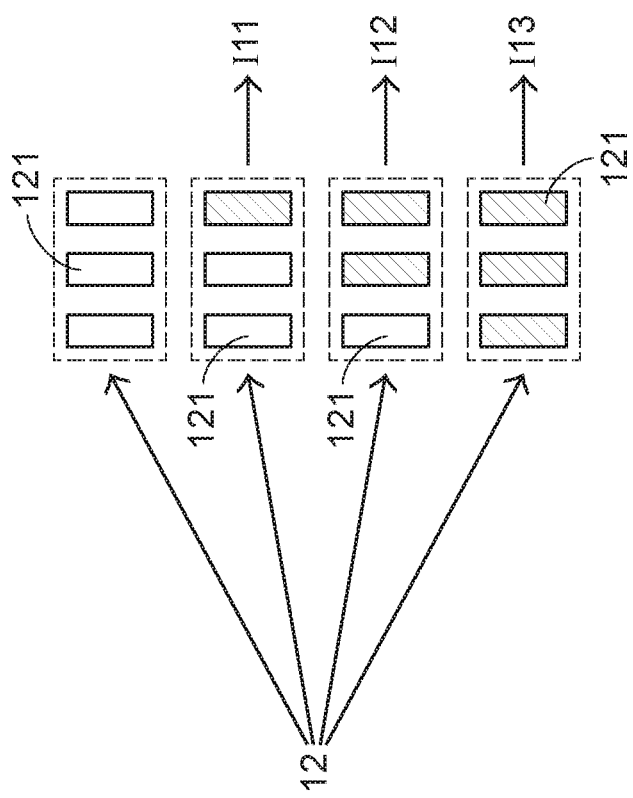
FIG. 1C schematically illustrates the use of the focus mode indication module of the digital photographing device as shown in FIG. 1A to indicate different focus modes.

The present invention provides digital photographing device. A first embodiment of the digital photographing device will be described as follows. FIG. 1A is a schematic perspective view illustrating the implementation concepts of operating a digital photographing device according to a first embodiment of the present invention. FIG. 1B is a schematic front view illustrating a digital photographing main body of the digital photographing device according to the first embodiment of the present invention. FIG. 1C schematically illustrates the use of the focus mode indication module of the digital photographing device as shown in FIG. 1A to indicate different focus modes.

Please refer to FIGS. 1A and 1B. The digital photographing device 1 comprises a digital photographing main body 11 and a focus mode indication module 12. The focus mode indication module 12 is installed in the digital photographing main body 11. After a user 3 controls a switching control module 2 to generate a focus switching control signal W, the digital photographing main body 11 receives the focus switching control signal W. In response to the focus switching control signal W, the focus mode indication module 12 generates a focus mode indication signal I1 to indicate that the digital photographing main body 11 is in one of at least two manual focus modes.

The digital photographing main body 11 comprises a casing surface 111, a lens cover 112 and a lens element 113. The casing surface 111 at least includes a front surface 1111, a left surface (not shown) and a right surface (not shown).

In this embodiment, the switching control module 2 is a wireless switching control module. In other words, the focus switching control signal W is a wireless focus switching control signal. When the user 3 faces the front surface 1111, the wireless switching control module 2 can be operated to generate the wireless focus switching control signal W to the digital photographing main body 11.

For example, the wireless switching control module 2 is a portable handheld device such as a wireless remote controller, a mobile phone or a tablet computer. In this embodiment and the following embodiments, a wireless remote controller 21 is taken as the example of the wireless switching control module 2. Under this circumstance, the wireless switching control module 2 and the digital photographing main body 11 are included in the digital photographing device 1. That is, the digital photographing device 1 comprises the wireless switching control module 2 and the digital photographing main body 11.

In some other embodiments, the wireless switching control module 2 is a mobile phone, a tablet computer or any other appropriate portable handheld device (not shown). Moreover, the wireless switching control module 2 is in communication with the digital photographing main body 11 to control the digital photographing main body 11 according to a Wi-Fi transmission technology, a Bluetooth transmission technology or any other appropriate transmission technology.

In this embodiment, the focus mode indication module 12 is an optical-type focus mode indication module. The optical-type focus mode indication module 12 is installed in the digital photographing main body 11 and located near the front surface 1111 of the lens element 113. In an embodiment, the optical-type focus mode indication module 12 comprises plural LED lamps 121. The LED lamps 121 are used to generate an optical-type focus mode indication signal I1 to indicate that the digital photographing main body 11 is in one of at least two manual focus modes.

For facilitating the user's operation and judgment, the manual focus modes at least comprise plural fixed focus modes that are often used by the user 3. For example, these manual focus modes at least include a short distance focus mode (e.g., in the range between 20 cm and 45 cm), a medium distance focus mode (e.g., in the range between 45 cm and 100 cm) and a long distance focus mode (e.g., in the range between 100 cm and an infinite distance). The examples of the manual focus modes are not restricted.

Please refer to FIG. 1C again. When the LED lamps 102 of the optical-type focus mode indication module 12 are turned off, it means that the digital photographing main body 11 is in an autofocus mode. When one of the plural LED lamps 121 is turned on to generate a first optical-type focus mode indication signal I11, it means that the focus mode of the digital photographing main body 11 is switched to the short distance focus mode in response to the wireless focus switching control signal W. When two of the plural LED lamps 121 are turned on to generate a second optical-type focus mode indication signal I12, it means that the focus mode of the digital photographing main body 11 is switched to the medium distance focus mode in response to the wireless focus switching control signal W. When three of the plural LED lamps 121 are turned on to generate a third optical-type focus mode indication signal I13, it means that the focus mode of the digital photographing main body 11 is switched to the long distance focus mode in response to the wireless focus switching control signal W.

Consequently, when the user 3 faces the front surface 1111 of the digital photographing main body 11 to take a selfie or create a live stream, the user 3 can easily operate the wireless remote controller 21 to generate the wireless focus switching control signal W so as to control the digital photographing main body 11. In addition, the user 3 can receive and confirm the focus mode indication signal I1 from the digital photographing main body 11. Consequently, the user 3 can easily recognize whether the current focus mode of the digital photographing main body 11 is in the autofocus mode or the manual focus mode. Since the types of the manual focus modes of the digital photographing main body 11 are not very complicated, this design is very user-friendly to largely reduce the troublesome of selecting the manual focus mode.

Figure 2:
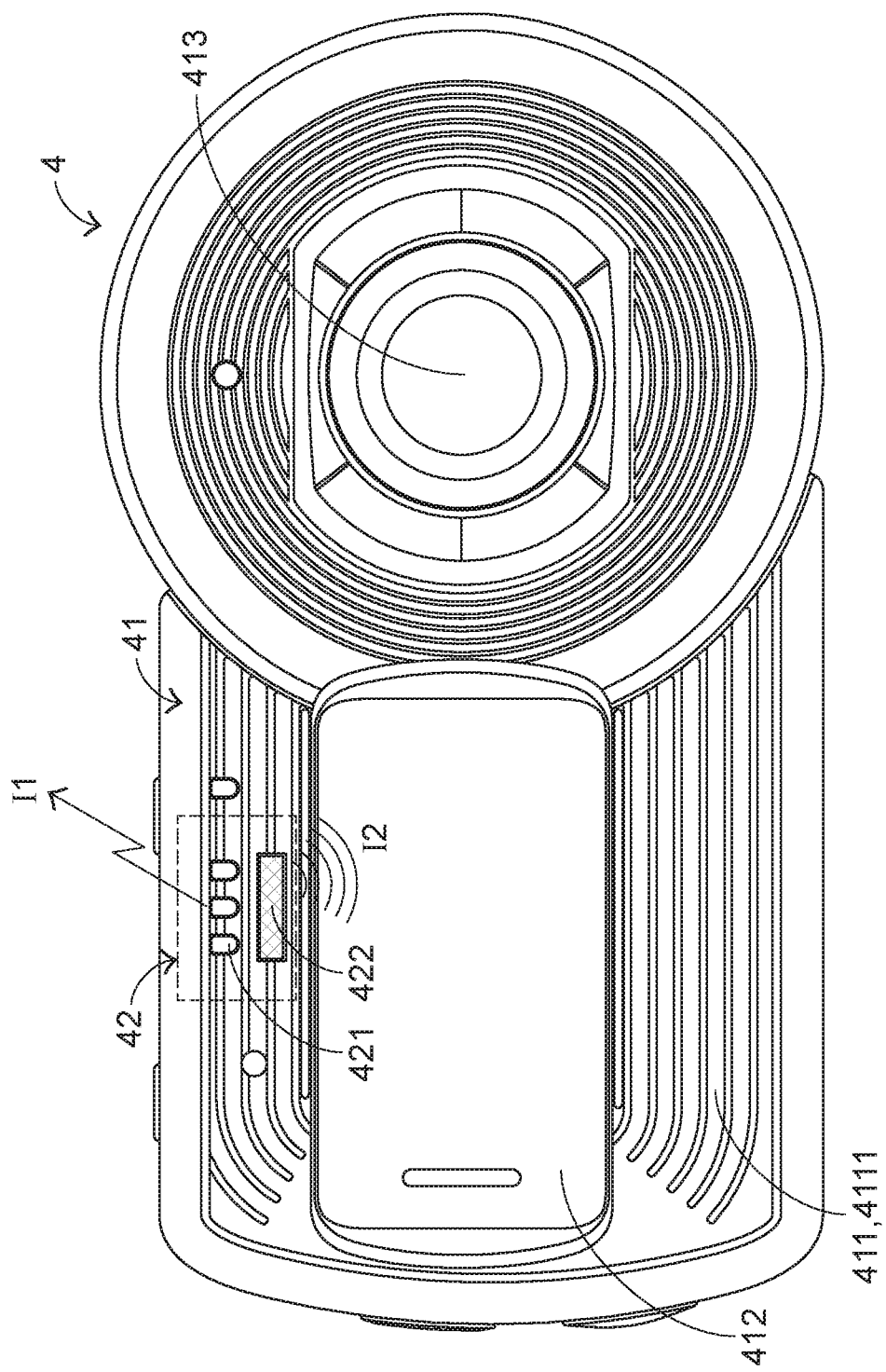
FIG. 2 is a schematic front view illustrating a digital photographing main body of a digital photographing device according to a second embodiment of the present invention.

FIG. 2 is a schematic front view illustrating a digital photographing main body of a digital photographing device according to a second embodiment of the present invention. In this embodiment, the digital photographing device 4 comprises a digital photographing main body 41 and a focus mode indication module 42. The focus mode indication module 42 is installed in the digital photographing main body 41. The digital photographing main body 41 comprises a casing surface 411, a lens cover 412 and a lens element 413. The casing surface 411 at least includes a front surface 4111, a left surface (not shown) and a right surface (not shown).

Please also refer to FIG. 1A. Similarly, after a user 3 controls the switching control module 2 to generate a focus switching control signal W, the digital photographing main body 41 receives the focus switching control signal W. In response to the focus switching control signal W, the focus mode indication module 42 generates a focus mode indication signal to indicate that the digital photographing main body 41 is in one of at least two manual focus modes.

In comparison with the embodiment of FIG. 1A, the focus mode indication module 42 of the digital photographing device 4 comprises an optical-type focus mode indication module and an audio-type focus mode indication module. The optical-type focus mode indication module comprises plural LED lamps 421. Like the example of FIG. 1A, the LED lamps 421 are used to generate the optical-type focus mode indication signal I1. For example, the audio-type focus mode indication module is an audio output element 422 (e.g., a speaker) to generate an audio-type focus mode indication signal I2.

In this embodiment, the LED lamps 421 are installed in the digital photographing main body 41 and located near the front surface 4111 of the lens element 413. The audio output element 422 is installed in at least one of the front surface 4111, the left surface and the right surface of the digital photographing main body 41.

Obviously, the digital photographing device 4 of this embodiment can provide more focus mode indication signals. Consequently, when the user 3 faces the front surface 4111 of the digital photographing main body 41 to take a selfie or create a live stream, the user 3 can receive and confirm the focus mode indication signal I1 and the audio-type focus mode indication signal I2 from the digital photographing main body 41. Consequently, the accuracy of switching the focus mode is enhanced.

Figure 3:
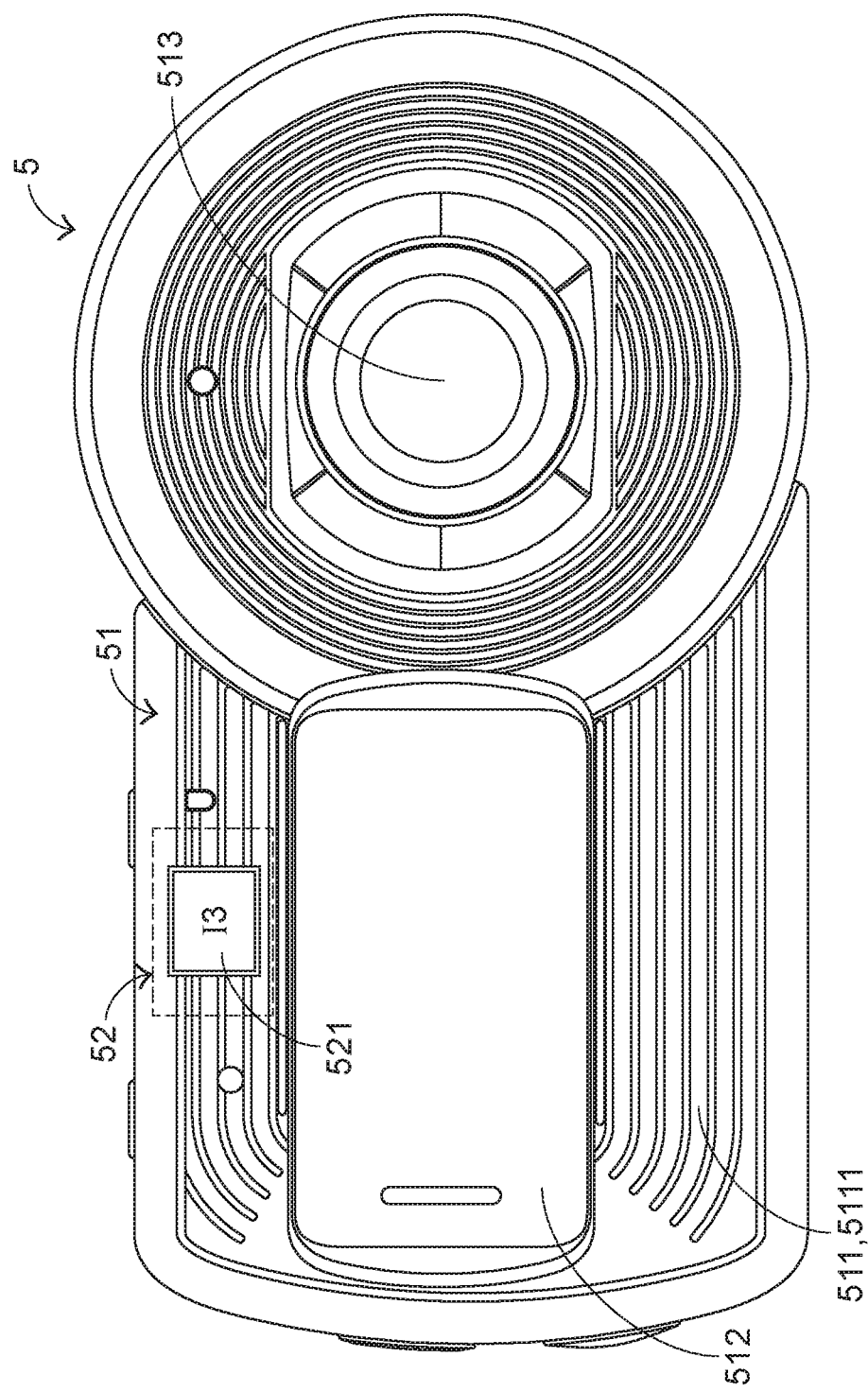
FIG. 3 is a schematic front view illustrating a digital photographing main body of a digital photographing device according to a third embodiment of the present invention.

FIG. 3 is a schematic front view illustrating a digital photographing main body of a digital photographing device according to a third embodiment of the present invention. In this embodiment, the digital photographing device 5 comprises a digital photographing main body 51 and a focus mode indication module 52. The focus mode indication module 52 is installed in the digital photographing main body 51. The digital photographing main body 51 comprises a casing surface 511, a lens cover 512 and a lens element 513. The casing surface 511 at least includes a front surface 5111, a left surface (not shown) and a right surface (not shown).

Please also refer to FIG. 1A. Similarly, after a user 3 controls the switching control module 2 to generate a focus switching control signal W, the digital photographing main body 51 receives the focus switching control signal W. In response to the focus switching control signal W, the focus mode indication module 52 generates a focus mode indication signal to indicate that the digital photographing main body 51 is in one of at least two manual focus modes.

In comparison with the embodiment of FIG. 1A, the focus mode indication module 52 of the digital photographing device 5 comprises another optical-type focus mode indication module. In this embodiment, the optical-type focus mode indication module comprises a digital display screen 521. The digital display screen 521 generates another optical-type focus mode indication signal I3, which is an image signal. Consequently, the accuracy of switching the focus mode is enhanced.

From the above descriptions, the present invention provides a digital photographing device. The digital photographing device can be operated in at least two manual focus modes to provide at least two different common focus lengths. The user can select a suitable manual focus mode from the at least two manual focus modes. When the user faces the digital photographing device to take a selfie or create a live stream, the user can realize the current focus mode of the digital photographing device according to the indication of the focus mode indication module. In other words, the digital photographing device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A digital photographing device, comprising:
a digital photographing main body comprising a lens element; and
a focus mode indication module installed in the digital photographing main body and located near a front surface of the lens element,
wherein after a user controls a switching control module to generate a focus switching control signal, the digital photographing main body receives the focus switching control signal, wherein in response to the focus switching control signal, the focus mode indication module generates a focus mode indication signal to indicate that the digital photographing main body is in one of at least two manual focus modes, wherein when the user faces the front surface of the lens element, the user receives and confirms the focus mode indication signal; and
wherein the switching control module is a wireless switching control module, and the focus switching control signal is a wireless focus switching control signal, wherein when the user faces the front surface of the lens element, the user controls the wireless switching control module to generate the wireless focus switching control signal to the digital photographing main body.

2. The digital photographing device according to claim 1, wherein the focus mode indication module is an optical-type focus mode indication module.

3. The digital photographing device according to claim 2, wherein the optical-type focus mode indication module comprises plural LED lamps or a digital display screen, wherein the optical-type focus mode indication module generates an optical-type focus mode indication signal to indicate that the digital photographing main body is in one of the at least two manual focus modes.

4. The digital photographing device according to claim 3, wherein the optical-type focus mode indication signal is optionally permitted to indicate that the digital photographing main body is in an autofocus mode.

5. The digital photographing device according to claim 1, wherein the at least two manual focus modes at least include a short distance focus mode, a medium distance focus mode and a long distance focus mode.

6. The digital photographing device according to claim 1, wherein the wireless switching control module is a portable handheld device, and the portable handheld device is a wireless remote controller, mobile phone or a tablet computer.

7. The digital photographing device according to claim 6, wherein the wireless switching control module is the wireless remote controller, and the digital photographing device comprises the wireless remote controller and the digital photographing main body.

8. A digital photographing device, comprising:
a digital photographing main body comprising a lens element; and
a focus mode indication module installed in the digital photographing main body,
wherein after a user controls a switching control module to generate a focus switching control signal, the digital photographing main body receives the focus switching control signal, wherein in response to the focus switching control signal, the focus mode indication module generates a focus mode indication signal to indicate that the digital photographing main body is in one of at least two manual focus modes; and
wherein the switching control module is a wireless switching control module, and the focus switching control signal is a wireless focus switching control signal, wherein when the user faces the front surface of the lens element, the user controls the wireless switching control module to generate the wireless focus switching control signal to the digital photographing main body.

9. The digital photographing device according to claim 8, wherein the focus mode indication module comprises at least one of an optical-type focus mode indication module and an audio-type focus mode indication module.

10. A digital photographing device, comprising:
a digital photographing main body comprising a lens element; and
a focus mode indication module installed in the digital photographing main body,
wherein after a user controls a switching control module to generate a focus switching control signal, the digital photographing main body receives the focus switching control signal, wherein in response to the focus switching control signal, the focus mode indication module generates a focus mode indication signal to indicate that the digital photographing main body is in one of at least two manual focus modes;
wherein the focus mode indication module comprises at least one of an optical-type focus mode indication module and an audio-type focus mode indication module; and
wherein the optical-type focus mode indication module is installed in the digital photographing main body and located near a front surface of the lens element, and the user receives and confirms the focus mode indication signal when the user faces the front surface of the lens element, wherein the audio-type focus mode indication module is installed in the front surface, a left surface or a right surface of the lens element.

11. The digital photographing device according to claim 9, wherein the optical-type focus mode indication module comprises plural LED lamps or a digital display screen, wherein the optical-type focus mode indication module generates an optical-type focus mode indication signal to indicate that the digital photographing main body is in one of the at least two manual focus modes, wherein the audio-type focus mode indication module is an audio output element, and the audio output element generates an audio-type focus mode indication signal to indicate that the digital photographing main body is in one of the at least two manual focus modes.

12. The digital photographing device according to claim 11, wherein the optical-type focus mode indication signal or the audio-type focus mode indication signal is optionally permitted to indicate that the digital photographing main body is in an autofocus mode.

13. The digital photographing device according to claim 8, wherein the at least two manual focus modes at least include a short distance focus mode, a medium distance focus mode and a long distance focus mode.

14. The digital photographing device according to claim 8, wherein the wireless switching control module is a portable handheld device, and the portable handheld device is a wireless remote controller, mobile phone or a tablet computer.

15. The digital photographing device according to claim 14, wherein the wireless switching control module is the wireless remote controller, and the digital photographing device comprises the wireless remote controller and the digital photographing main body.

* * * * *